United States Patent
Falkner, Jr.

(10) Patent No.: US 7,430,423 B1
(45) Date of Patent: Sep. 30, 2008

(54) WIRELINE TELEPHONY INSTRUMENT FOR WIRELESSLY RECEIVING AND DISPLAYING DATA MESSAGES

(75) Inventor: Robert F. Falkner, Jr., Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 985 days.

(21) Appl. No.: 10/768,926

(22) Filed: Jan. 30, 2004

(51) Int. Cl.
*H04M 7/20* (2006.01)
(52) U.S. Cl. .................................... 455/466; 379/88.13
(58) Field of Classification Search ............... 379/93.01
See application file for complete search history.

(56) References Cited

U.S. PATENT DOCUMENTS

| | | | | |
|---|---|---|---|---|
| 5,584,070 A | * | 12/1996 | Harris et al. | 340/7.54 |
| 2002/0106994 A1 | * | 8/2002 | Payne et al | 455/74.1 |
| 2005/0069101 A1 | * | 3/2005 | Bear et al. | 379/88.17 |
| 2005/0069109 A1 | * | 3/2005 | Elias et al. | 379/111 |
| 2005/0124301 A1 | * | 6/2005 | Schmitz et al. | 455/83 |
| 2006/0006230 A1 | * | 1/2006 | Bear et al. | 235/435 |
| 2006/0109836 A1 | * | 5/2006 | Goertz et al. | 370/352 |

OTHER PUBLICATIONS

"Vialta Beamer Phone Video Station Videophone Telephone Display Screen BM-80," http://shop.store.yahoo.com/shoptronics/vibephvistvi.html, Printed Dec. 17, 2003.
"Qualcomm announces combined GSM and CDMA chipset," http://www.pmn.co.uk/20021113qualcomm.shtml, printed Dec. 31, 2003.
"Wireline SMS—reaching a new SMS subscriber base," http://www.e-searchwireless.com/marketdata.nsf/popupdocs/F96434C0DCD2BC5280256BE40045 ..., Printed Sep. 12, 2003.
"Bharti Telesoft Wireline SMS Solution," www.intel.com/business/bss/solutions/blueprints/pdf/bharti-telesoft-sb.pdf, Printed Sep. 12, 2003.
"Ceiva Digital Photo Receiver," http://www.ceiva.com, Printed Sep. 12, 2003.
"BT Diverse 4010 Executive SMS Phone," http://www.telehones-online.co.uk/itm00850.htm, Printed Sep. 12, 2003.

* cited by examiner

*Primary Examiner*—Creighton H Smith

(57) ABSTRACT

A wireline telephony instrument for wirelessly receiving and displaying data messages allows a wireline telephone to wirelessly receive data messages. The data messages may include text, images, and other types of multimedia data. Wireless receive-only capabilities may be integrated into the wireline telephony instrument by adding an integrated circuit, such as a CDMA chipset or a GSM chipset, to the wireline telephony instrument. Further, by integrating a display into the wireline telephony instrument, the wireline telephony instrument may display the data messages. Logic is also integrated into the wireline telephone for routing the data messages received by the wireline telephone to the display.

12 Claims, 3 Drawing Sheets

WIRELINE TELEPHONY INSTRUMENT FOR WIRELESSLY RECEIVING AND DISPLAYING DATA MESSAGES

FIELD OF THE INVENTION

The present invention relates to communication systems and, more particularly, to a wireline telephony instrument for wirelessly receiving and displaying data messages.

BACKGROUND

Short messaging service ("SMS") and multimedia messaging service ("MMS") have become very popular methods of transferring data to and from wireless devices. SMS provides a mechanism for transmitting short alphanumeric messages to and from wireless devices. Currently, alphanumeric messages up to 160 characters can be supported.

A wireless network may provide a short message service center ("SMSC") which acts as a store and forward system for short messages. The store and forward function provides a method of sending short messages to their destination recipient or storing those messages if the recipient is unavailable to receive them. This store and forward function can generally be distinguished from the real-time delivery requirements of voice calls, although SMS messages may be delivered in real time.

The SMSC can send messages to or from a functional entity known as a short message entity ("SME"). The SME is an entity that can receive or send short messages. The SME is often an application entity that resides on a mobile station. Alternatively, the SME can reside on another entity in a wireless or fixed network. Typically, the SME can be arranged to compose, store, dispose of, act upon, display and/or otherwise manage short messages. The SME may also perform signaling functions to support other delivery features; such as mobile station location and status queries, and mapping of destination addresses.

An SMS message may be sent to a mobile station. In this scenario, the SMS message is referred to as a mobile-terminated short message ("MT-SM"). When a MT-SM message is sent to a mobile station, the SMSC sends an SMS Request to a home location register ("HLR") to find the mobile station. The HLR provides the mobile station's status, (e.g., whether the station is active or inactive, where the mobile station is located) to the SMSC. If the mobile station is inactive, the SMSC holds the MT-SM message for a period of time. When the mobile station is activated, the HLR sends an SMS Notification to the SMSC. The SMSC then attempts to deliver the MT-SM message to the mobile station.

Additionally, an SMS message may be sent by a mobile station to a terminating device. In this scenario, the SMS message is referred to as a mobile-originated short message ("MO-SM"). Mobile-originated short messages are transported from the mobile station to the SMSC and can be destined for other mobile stations or to subscribers on fixed networks, such as paging networks or electronic mail networks. The network associated with the terminating device pages the terminating device. If the terminating device responds, the MO-SM message is sent to the terminating device and the network notifies the SMSC that the MO-SM message has been sent.

MMS is a means by which multimedia messages can be sent over the air interface to and from wireless devices. Multimedia consists of one or more media elements, such as text, voice, image, and video. A wireless network may provide a multimedia messaging service center ("MMSC") which stores MMS messages and transmits an MMS notifier to a terminating device. In response to the MMS notifier, the terminating device may give the MMSC permission to deliver the stored MMS message.

Other methods of delivering data messages to and from wireless devices are also known. For example, Sprint customers using Vision cell phones may send pictures with Picture Mail and video with Video Mail. These delivery methods use data messaging standards different from SMS and MMS.

SUMMARY

A wireline telephony instrument for wirelessly receiving and displaying data messages, such as SMS and MMS messages, is described. The data messages may include text, images, and other types of multimedia data. By integrating wireless receive-only capabilities into a wireline telephone, the wireline telephone may wirelessly receive data messages. The wireless receive-only capabilities may be integrated into a wireline telephone by adding an integrated circuit, such as a Global System for Mobile Communications ("GSM") chipset or a Code Division Multiple Access ("CDMA") chipset, to the wireline telephone. Further, by integrating a display into the wireline telephone, the wireline telephone may display the data messages to the user. Preferably, the display is a high-resolution display that has the capability of displaying images as well as text. Logic is also integrated into the wireline telephone for routing the data messages wirelessly received by the wireline telephone to the display.

As a result of adding the wireless receive-only capabilities, the display, and the logic to the wireline telephone, a user of the wireline telephone may wirelessly receive data messages. Wireless carriers may expand revenue and customer retention opportunities by providing data messaging services to wireline telephone users having a wireline telephony instrument for wirelessly receiving and displaying data messages. As a result, the wireline telephone users may enjoy the SMS, MMS, and other data messaging services currently used by wireless customers.

This as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Users of wireless devices currently enjoy wirelessly receiving data messages, such as SMS, MMS, Picture Mail, and Video Mail messages. However, users of wireline telephones have not been able to wirelessly receive data messages from these messaging services. By modifying a wireline telephone, the user of the wireline telephone may wirelessly receive data messages. The wireline telephone may be modified by integrating wireless receive-only capabilities, a display, and logic into the wireline telephone. As a result, the users of a wireline telephone may wirelessly receive data messages.

Figure 1:
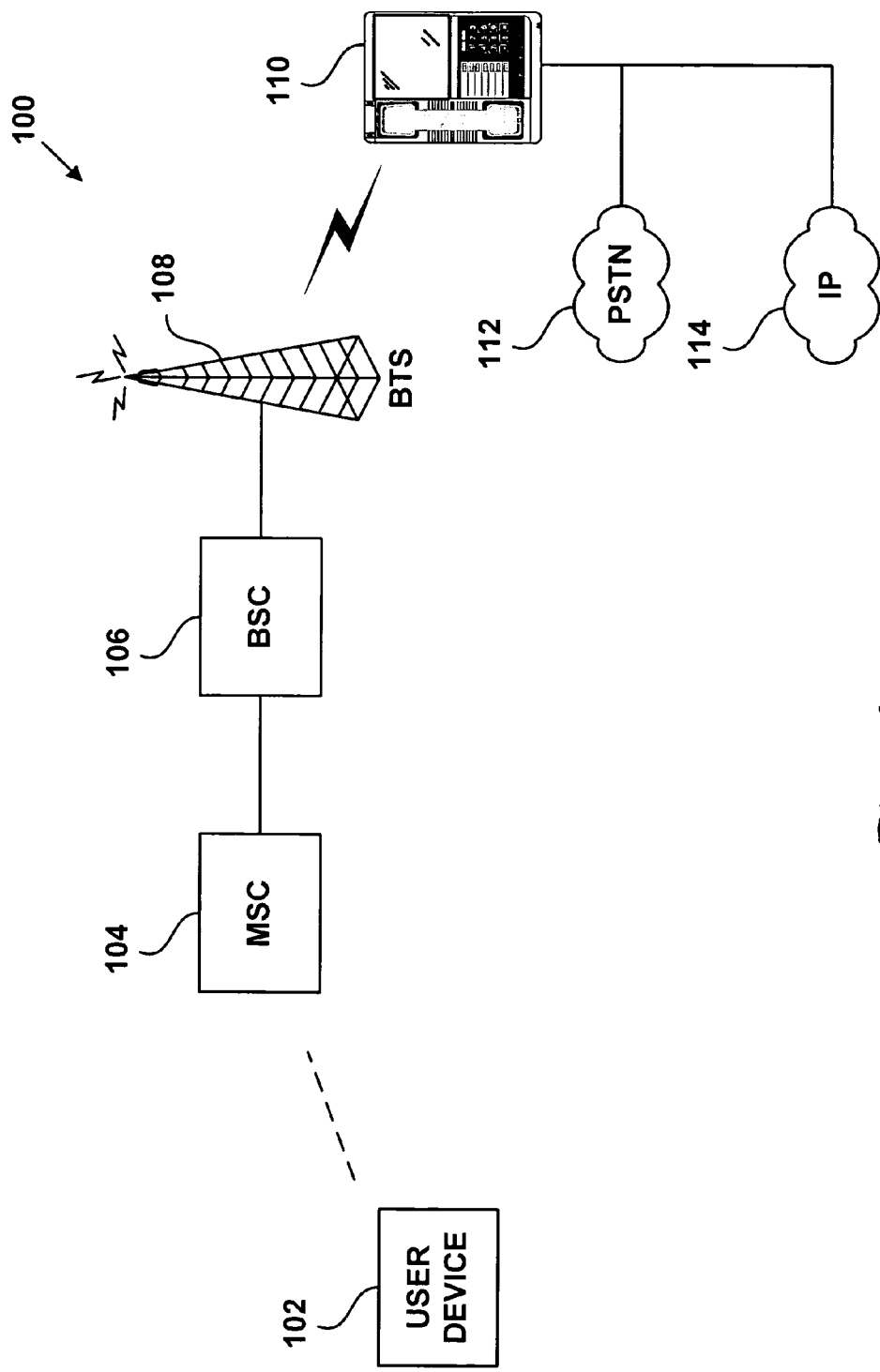
FIG. 1 is a pictorial representation of a system for wirelessly delivering data messages to a wireline telephone in accordance with an exemplary embodiment.

FIG. 1 is a block diagram of a system 100 for wirelessly delivering data messages to a wireline telephone in accordance with an exemplary embodiment. The system 100 includes a user device 102, a mobile switching center ("MSC") 104, a base station controller ("BSC") 106, base transceiver station ("BTS") 108, and a wireline telephony instrument 110 (referred to herein as a wireline telephone). The MSC 104, the BSC 106, and the BTS 108 may be components located in a wireless network. The wireless network may also include additional components, such as an HLR, an SMSC, and an MMSC. FIG. 1 also depicts a Public Switched Telephone Network ("PSTN") 112 and an Internet Protocol ("IP") Network 114. The wireline telephone 110 may transmit and receive voice messages over the PSTN 112, the IP Network 114, or other wired network, such as a corporate network, as is well known in the art.

The user device 102 may be any device that is operable to transmit data messages. The data messages may include SMS, MMS, Picture Mail, and Video Mail messages. For example, the user device 102 may be a mobile station, a personal digital assistant ("PDA"), or a computer. The user device 102 may be a wireless or a wireline user device.

The connection between the user device 102 and the MSC 104 is shown with a dashed line in FIG. 1 to indicate that there may be one or more components between the user device 102 and the MSC 104. For example, if the user device 102 is a mobile station, the user device 102 may send the data message to a BTS. The BTS may be BTS 108 or another BTS depending on the location of the user device 102. As another example, if the user device 102 is a computer, the user device 102 may send the data message to a gateway that sends an email from the computer to an SMSC.

The wireless network may use CDMA technology, though other types of wireless technologies, such as GSM, may also be used. The wireless network may include multiple cells, each of which is defined by a radio frequency ("RF") radiation pattern from a respective BTS. The BTS 108 may communicate with the BSC 106, which may communicate with the MSC 104. The MSC 104 performs switching functions, controlling calls to and from other telephone and data systems, including the SMSC and the MMSC.

The BTS 108 may wirelessly transmit a data message to the wireline telephone 110 through the air interface. The wireline telephone 110 may wirelessly receive the data message from the BTS 108 using integrated wireless receive-only capabilities. The term "wireless receive-only capability" is used herein to mean that the wireline telephone 110 has the capability to receive data messages wirelessly, but does not have the capability to wirelessly transmit data messages other than the data messages used to indicate receipt of the data message, such as an acknowledgement message. The data message may be an SMS message, an MMS message, or other data message. The wireline telephone 110 may display the data message on an integrated display.

The wireline telephone 110 may be a Plain Old Telephone Service ("POTS") telephone or a Voice over Internet Protocol ("VoIP") telephone that has been modified. The POTS or VoIP wireline telephone may be modified by integrating wireless receive-only capability, a display, and logic into the wireline telephone to produce the wireline telephone 110. Further, the wireline telephone 110 may be a cordless telephone having a base unit and one or more handsets.

The wireless receive-only capabilities may be integrated into the wireline telephone using CDMA, GSM, or other wireless technologies. The integrated display may allow the user of the wireline telephone 110 to view data messages, including text, image, and other multimedia messages. Additional details regarding the wireline telephone 110 are described with reference to FIG. 2.

The PSTN 112 may connect calls (i.e., voice messages) to and from the wireline phone 110 via a central office. The PSTN 112 is depicted in FIG. 1 to indicate that the wireline telephone 110 does not wirelessly receive or transmit voice messages. Alternatively, the wireline telephone 110 may be connected to the IP network 114. The IP network 114 may connect calls to and from the wireline telephone 110 via an IP telephony server. In this scenario, the wireline telephone 110 also does not wirelessly receive or transmit voice messages.

Figure 2:
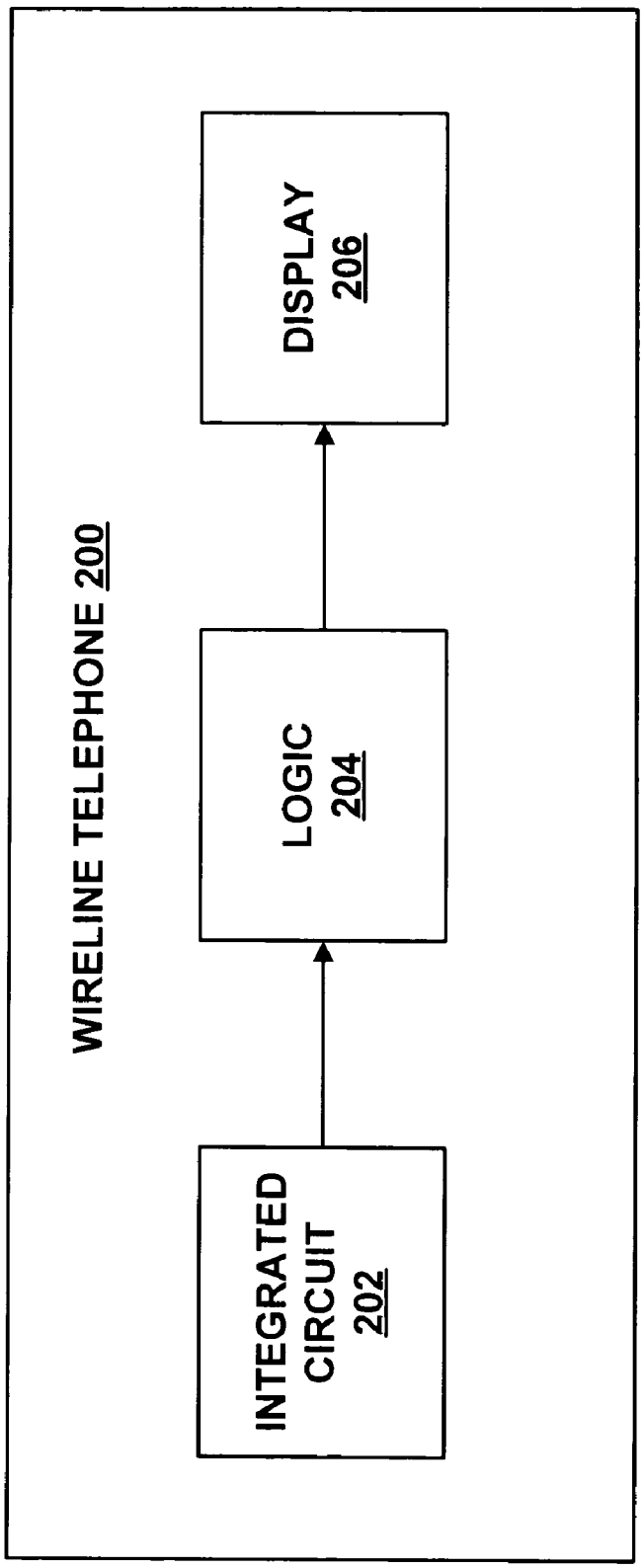
FIG. 2 is a block diagram of a wireline telephone in accordance with an exemplary embodiment.

FIG. 2 is a block diagram of a wireline telephone 200 for receiving and displaying wireless messages in accordance with an exemplary embodiment. The wireline telephone 200 may be a POTS telephone, a VoIP telephone, and/or a cordless telephone. The wireline telephone 200 may include an integrated circuit 202, logic 204, and a display 206. The wireline telephone 200 may include other components typically located in a wireline telephone.

The integrated circuit 202 may provide wireless receive-only capabilities to the wireline telephone 200. The integrated circuit 202 may allow the wireline telephone 200 to wirelessly receive data messages from the wireless user device 102. The data messages may include text, (e.g. MPEG2 and RealMedia files). For example, the data message may be streaming video from a camera phone.

The integrated circuit 202 may be a commercially available GSM chipset, CDMA chipset, combination GSM and CDMA chipset, or any other wireless technologies that function to receive wireless data transmissions now known or developed in the future. For example, Qualcomm's MSM6250 chipset, which is a combined GSM and CDMA chipset, may be used. Alternatively, the integrated circuit 202 may be custom designed for a particular wireline telephone configuration.

In another embodiment, the integrated circuit 202 may provide wireless transmit capabilities to the wireline telephone 200. In this embodiment, the integrated circuit 200 may include both wireless receive and transmit capabilities. However, by adding wireless transmit capabilities to the wireline telephone 200 additional bandwidth allocation may be necessary. The wireless transmit capabilities may allow the wireline telephone 200 to send, acknowledge, or otherwise communicate via data messaging to the user device 102.

The logic 204 may provide an interface between the integrated circuit 202 and the display 206. The logic 204 may be any combination of hardware, software, and/or firmware operable to route data messages wirelessly received by the integrated circuit 202 to the display 206. The logic 204 may include a commercially available display driver for displaying high-resolution images. Alternatively, the display driver may be custom designed for a particular wireline telephone configuration. The logic 204 may be capable of driving high-resolution monochrome displays and/or high-resolution color displays (e.g., RGB displays). The logic 204 may reformat the data messages to fit the display 206. Further, the logic 204 may include memory for temporarily storing data messages.

The display 206 may be a high-resolution display operable to display data messages. The data messages may include text, images, and other multimedia data. Accordingly, the display 206 may have more resolution than a display designed to display text only. The display 206 may be a commercially available display similar to a display located in a user device having MMS and/or camera features. Alternatively, the display 206 may be custom designed for a particular wireline telephone configuration. The display 206 may display high-resolution monochrome and/or color images. If the wireline telephone 200 is a cordless telephone, the display 200 may be located on the base unit and/or on the one or more handsets.

When the user device 102 sends a data message to the wireline telephone 200, the integrated circuit 202 may wirelessly receive the data message. The integrated circuit 202 may forward the data message to the logic 204. The logic 204 may process the data message to fit the data message on the display 206 and then route the processed data message to the display 206. The display 206 may then display the data message for viewing. The user of the wireline telephone 200 may view the data message on the display 206. By integrating the wireless receive-only capabilities, the logic, and the display into the wireline telephone 200, the wireline telephone 200 can wirelessly receive text, images, or other types of multimedia messages from the BTS 108.

The integrated circuit 202, the logic 204, and the display 206 may be integrated into the wireline telephone 200 at the time of manufacture. Alternatively, the wireline telephone 200 may be retrofitted after manufacture to include the integrated circuit 202, the logic 204, and the display 206. The process of adding additional components to a wireline telephone is known to those skilled in the art.

Figure 3:
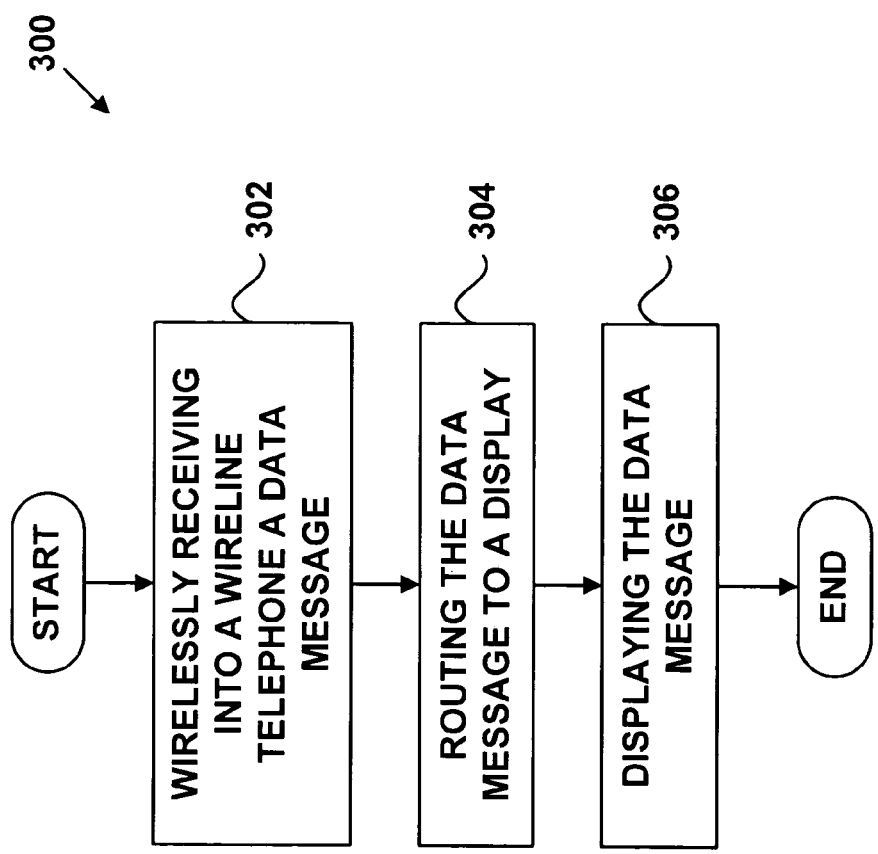
FIG. 3 is a flow chart of a method of wirelessly receiving and displaying data messages by the wireline telephone depicted in FIG. 2 in accordance with an exemplary embodiment.

FIG. 3 is a flow chart of a method 300 of wirelessly receiving and displaying data messages by a wireline telephone in accordance with an exemplary embodiment. At block 302, the wireline telephone 200 wirelessly receives a data message. The integrated circuit 202 may wirelessly receive the data message from the BTS 108. The integrated circuit 202 may be a GSM chipset, a CDMA chipset, a combination GSM/CDMA chipset, or any other chipset that functions to receive wireless data transmissions now known or developed in the future.

At block 304, the data message may be routed to a display. The logic 204 may route the data message from the integrated circuit 202 to the display 206. The logic 204 may be any combination of hardware, software, and/or firmware operable to route data messages received by the integrated circuit 202 to the display 206. The logic 204 may include a commercially available display driver for displaying high-resolution images. The logic 204 may be capable of driving high-resolution monochrome displays and/or high-resolution color displays (e.g., RGB displays). The logic 204 may reformat the data messages to fit on the display 206.

At block 306, the data message is displayed. The data message may be displayed on the display 206. The display 206 may be a high-resolution display operable to display data messages, including images as well as text. The display 206 may be similar to a display in a user device having MMS and/or camera features. The display 206 may display high-resolution monochrome and/or color images. A user of the wireline telephone 200 may view the data message on the display.

An exemplary embodiment of the present invention has been described above. Those skilled in the art will understand that changes and modifications may be made to this embodiment without departing from the true scope and spirit of the present invention, which is defined by the claims.

I claim:

1. A method of wirelessly receiving and displaying data messages by a wireline telephone, comprising in combination:

wirelessly receiving into the wireline telephone a data message, wherein wirelessly receiving the data message comprises a wireless receive-only capability integrated into the wireline telephone wirelessly receiving the data message;

routing the data message to a display; and displaying the data message wirelessly received by the wireline telephone on the display.

2. The method of claim 1, wherein the wireless receive-only capability comprises an integrated circuit.

3. The method of claim 2, wherein the integrated circuit comprises a chipset selected from the group consisting of a GSM chipset, a CDMA chipset, and a combination GSM and CDMA chipset.

4. The method of claim 1, wherein the data message comprises data selected from the group consisting of text and images.

5. The method of claim 1, wherein routing the data message comprises a display driver routing the data message.

6. The method of claim 1, wherein the display is operable to display data selected from the group consisting of text and images.

7. A wireline telephony instrument for wirelessly receiving and displaying data messages, comprising in combination:

a wireless receive-only capability integrated into the wireline telephone instrument and operable to wirelessly receive a data message sent to the wireline telephony instrument, the wireless receive-only capability comprising an integrated circuit operable to receive the data message;

a display operable to display the data message received by the integrated circuit; and logic operable to route the data message received by the integrated circuit to the display.

8. The wireline telephony instrument of claim 7, wherein the integrated circuit comprises a chipset selected from the group consisting of a GSM chipset, a CDMA chipset, and a combination GSM and CDMA chipset.

9. The wireline telephony instrument of claim 7, wherein the data message comprises data selected from the group consisting of text and images.

10. The wireline telephony instrument of claim 7, wherein the display is operable to display data from the group consisting of text and images.

11. The wireline telephony instrument of claim 7, wherein the logic includes a display driver.

12. A wireline telephony instrument for wirelessly receiving and displaying data messages, comprising in combination:

a wireless receive-only capability integrated into the wireline telephone instrument and operable to wirelessly receive a data message sent to the wireline telephony instrument, the wireless receive-only capability comprising an integrated circuit operable to receive the data message, wherein the integrated circuit comprises a chipset selected from the group consisting of a GSM chipset, a CDMA chipset, and a combination GSM and CDMA chipset;

a display operable to display the data message received by the integrated circuit, wherein the data message comprises data consisting of text and images; and a display driver operable to route the data message received by the integrated circuit to the display.

* * * * *